(12) United States Patent
Touboul et al.

(10) Patent No.: US 9,049,699 B2
(45) Date of Patent: Jun. 2, 2015

(54) WIRELESS BACKHAUL

(75) Inventors: Assaf Touboul, Natanya (IL); Oz Barak, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 12/494,333

(22) Filed: Jun. 30, 2009

(65) Prior Publication Data

US 2009/0323621 A1  Dec. 31, 2009

Related U.S. Application Data

(60) Provisional application No. 61/076,708, filed on Jun. 30, 2008.

(51) Int. Cl.
 *H04W 72/04* (2009.01)
 *H04W 92/20* (2009.01)

(52) U.S. Cl.
 CPC .............. *H04W 72/04* (2013.01); *H04W 92/20* (2013.01)

(58) Field of Classification Search
 USPC ......... 370/310, 320, 321, 322, 324, 327, 329, 370/330
 See application file for complete search history.

(56) References Cited

U.S. PATENT DOCUMENTS

| | | | |
|---|---|---|---|
| 5,936,754 A | 8/1999 | Ariyavisitakul et al. | |
| 7,689,228 B2 * | 3/2010 | Labedz | 455/452.1 |
| 7,948,962 B2 * | 5/2011 | Calvert et al. | 370/348 |
| 7,965,990 B2 * | 6/2011 | Luz et al. | 455/103 |
| 2002/0159409 A1 * | 10/2002 | Wolfe et al. | 370/329 |
| 2005/0215264 A1 * | 9/2005 | Subramaniam et al. | 455/452.2 |
| 2007/0265013 A1 | 11/2007 | Labedz | |
| 2008/0049672 A1 | 2/2008 | Barak et al. | |
| 2008/0076435 A1 | 3/2008 | Chen et al. | |
| 2008/0090575 A1 | 4/2008 | Barak et al. | |
| 2009/0103492 A1 * | 4/2009 | Altshuller et al. | 370/331 |
| 2011/0051670 A1 * | 3/2011 | Safarian et al. | 370/328 |

FOREIGN PATENT DOCUMENTS

| | | |
|---|---|---|
| EP | 1401150 A2 | 3/2004 |
| EP | 1786217 A1 | 5/2007 |
| WO | WO-2008037853 A1 | 4/2008 |

OTHER PUBLICATIONS

International Search Report and Written Opinion, Int'l App. No. PCT/IL2009/000655, ISA/EPO, Oct. 28, 2009, 6 pgs.
Supplementary European Search Report, EP App. No. 09773049.3, EPO Search Authority—Munich, Jun. 7, 2011, 2 pgs.

* cited by examiner

*Primary Examiner* — Donald Mills
*Assistant Examiner* — Henry Baron
(74) *Attorney, Agent, or Firm* — Holland & Hart LLP

(57) ABSTRACT

A method and system for providing wireless backhaul in a wireless radio access network having an overall allocated access bandwidth for access communication, the system including a radio access base station designed for out-of-band backhaul, the base station including an access transceiver communicating over an allocated frequency channel within the overall allocated access bandwidth, and an in-band backhaul unit coupled to the access base station including means for in-band communication of backhaul of the access base station.

27 Claims, 3 Drawing Sheets

WIRELESS BACKHAUL

CROSS REFERENCES

The present Application for Patent claims priority to U.S. Provisional Patent Application No. 61/076,708 by Touboul et al., entitled "Wireless Backhaul," filed Jun. 30, 2008, assigned to the assignee hereof, and expressly incorporated by reference herein.

FIELD OF THE INVENTION

The present invention relates to communications networks, in general and, in particular, to point-to-point backhaul communication in wireless access communication networks.

BACKGROUND OF THE INVENTION

Communication in broadband wireless networks is generally divided between access and backhaul. A radio access network (known as RAN) is the air interface network providing traffic communication between mobile terminals (subscribers) and their associated access points (base stations), while a backhaul network is the air interface network providing traffic communication between the various base stations and a core network. The networks may be arranged to transfer data alone, or may be arranged for triple play services (video, audio and data). In conventional systems, the access network and the backhaul network each require their own separate transmission equipment, antennas, etc., at great cost to the operator. These Radio Access Networks (RAN) use an out-of-band backhauling method, where access and backhauling networks communicate over separate and widely separated frequency bands, thus wasting the important resource of spectrum.

One example of a conventional backhaul network involves connecting wireless base stations to corresponding core mobile networks (such as ASN GateWay, AAA servers, etc). The choice of backhaul technology must take into account such parameters as capacity, cost and coverage. Base station backhaul typically is performed via wired infrastructure (e.g., E1/T1 leased lines), or via wireless Point-to-point (PTP) microwave links to each base station, which is expensive to deploy, in terms of equipment and installation. In particular, due to the direct, uninterrupted line-of-sight requirements of the wireless backhaul equipment, in high frequency bands such as 6 GHz-36 GHz, the backhaul components of conventional base stations require strategic deployment at high locations on tall and expensive towers.

There are also known outdoor Wi-Fi (a registered trademark) networks, deployed mainly according to outdoor Wi-Fi mesh technology. In the micro/pico-cell deployment approach of conventional Wi-Fi mesh networks, due to multiple access point nodes in the network, backhauling becomes more complicated and costly. Backhauling each node via wired lines (E1/T1 or DSL) is impractical in a dense deployment of nodes. On the other hand, backhauling each node via traditional wireless PTP microwave links is expensive due to costly equipment and installation costs and deployment is not feasible on telephone poles, street poles, electricity poles, etc. In Wi-Fi, like in WiMAX (a registered trademark), PTP microwave links require high deployment to achieve a clear line-of-sight between nodes. In addition, when the network load increases, the backhaul network losses drastically degrade the overall network performance (by limiting capacity and increasing latency).

There is known from applicants' co-pending US patent application publication no. US 2008/0090575, entitled WiMAX Access Point Network with Backhaul Technology, a mobile wireless broadband communication network, as defined in IEEE Standard 802.16e-2005 Standardization for WiMAX. According to this application, there is provided in-band, point-to-point backhaul between the various access network elements in a wireless broadband network deployed in micro- or pico-cells. This wireless broadband communication network provides increased traffic capacity of the base station, while not greatly increasing the interference caused with neighboring cells, preferably by using several directional antennae on each base station, and utilizing MIMO or beam forming (spatial filtering) techniques to reduce interference. The backhaul system and method is described in greater detail in Applicant's co-pending US patent publication no. 2008/0049672, entitled Point-to-Point Backhaul with Interference Mitigation, with regard to applicants' wireless broadband, particularly WiMAX, networks. However, other wireless technologies, such as 3GPP-LTE, 3G, 3G-HSDPA, HSUPA, GSM and other cellular technologies, as conventionally implemented, have separate out-of-band backhaul networks and do not have the capability of such in-band backhaul between access points.

Consequently, there is a need for an in-band backhaul method that can be implemented in any of a variety of wireless telecommunication and cellular technologies.

SUMMARY OF THE INVENTION

There is provided according to the present invention a method for providing wireless backhaul in a wireless radio access network having an overall allocated access band for access communication, the method including coupling an in-band backhaul unit to a radio access base station designed for out-of-band backhaul, for communicating backhaul of the access base station, transmitting or receiving access communications over an allocated frequency channel within the overall allocated access band, and transmitting or receiving backhaul communications over a frequency channel in the overall allocated access band.

According to one embodiment of the invention, the step of transmitting includes transmitting backhaul communications over the allocated access frequency channel for that base station and the method further includes synchronizing the transmission and reception of in-band backhaul communications with the transmission and reception of the access communications between all of the backhaul units and all the base stations. This embodiment is operative in any access network where the in-band node transmits on the same frequency as the radio access network and is fully synchronized with the network.

According to an alternative embodiment of the invention, the step of transmitting includes transmitting backhaul communications over an allocated frequency channel within the overall allocated access band which is not the access frequency channel allocated to that base station.

There is also provided, according to the present invention, a system for providing wireless backhaul in a wireless radio access network having an overall allocated access bandwidth for access communication, the system including a radio access base station designed for out-of-band backhaul, the base station including an access transceiver communicating over an allocated frequency channel within the overall allocated access bandwidth, and an in-band backhaul unit coupled to the access base station including means for in-band communication of backhaul of the access base station.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to wireless Radio Access Networks (RAN), particularly mobile broadband networks, including but not limited to 3GPP-LTE®, 3G, 3G-HSDPA, HSUPA, conventional WiMAX® and other cellular technologies, having a plurality of access point nodes with a separate, conventional out-of-band backhaul network between the access point nodes and a core network, in which it is desired to provide backhaul, particularly in-band backhaul, between the access point nodes and possibly between the core and access point nodes. This is made possible by adding to the network a separate in-band backhaul unit coupled to the access base station for transmission and reception of the access base station's backhaul. Preferably, the in-band backhaul unit is fully synchronized with the access transceiver to which it is coupled and whose backhaul it transmits. According to the current invention, the same frequency band that, prior to the current invention, was used for radio access communication only, is used also for in-band backhauling. In this way, considerable savings of infrastructure costs (both deployment and equipment costs) can be achieved.

For purposes of the present invention, two types of in-band backhaul are provided. The first is conventional in-band backhaul, wherein a portion of the bandwidth (the frequency channel) allocated to an access base station for access communications is utilized, instead, for backhaul communications (i.e., communication on the same channel). The second is wherein a portion of the overall allocated access bandwidth in a particular Radio Access Network (RAN) (one or a few channels) is used for backhaul of all the base stations in that RAN, instead of being allocated to a single base station. In this case, the backhaul is in-band to the RAN access allocation (although it could be considered as out-of-band to the base stations).

Figure 1:
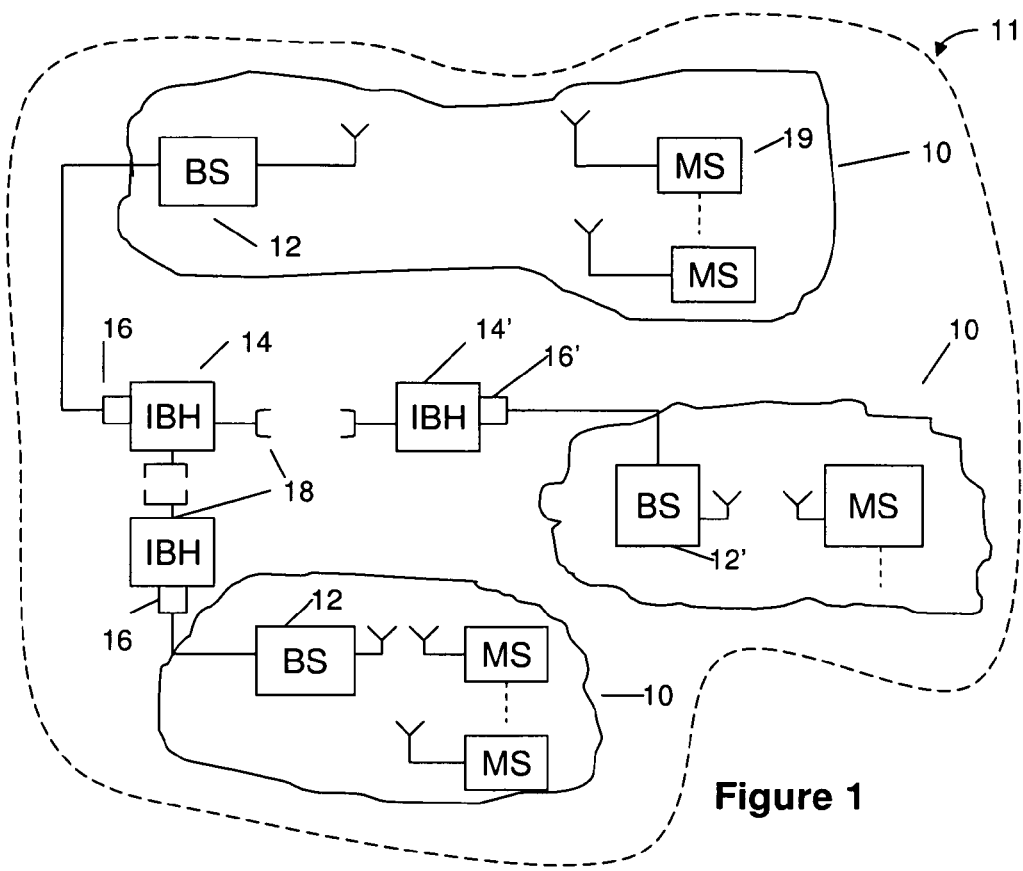
FIG. 1 is a schematic illustration of a telecommunications network constructed and operative in accordance with one embodiment of the invention.

Referring now to FIG. 1, there is shown a schematic illustration of a telecommunication network including a plurality of radio access networks (RAN) 10, constructed and operative in accordance with one embodiment of the invention, which are sub-networks of a larger RAN 11. Each RAN 10 includes base station equipment (BS) 12, which may be any conventional base station providing wireless access services. According to some embodiments of the invention providing in-band backhaul in each base station, the technology is such that a portion of each radio frame can be designated for a specific use, and coordination or synchronization can be provided. Each BS 12 is coupled to an In-Band Backhaul (IBH) unit 14 via an appropriate interface 16, such as an Ethernet port or a TDM interface (E1 or T1 interface), for backhaul communication between the different BSs 12. This interface is coupled to the IBH unit transceiver that operates in coordination with the BS, so as to provide efficient backhaul between BSs.

IBH unit 14 has at least one, and preferably a plurality of antennas 18. IBH unit 14 is designed and implemented for transmitting and receiving backhaul communications, and preferably includes means (not shown) for permitting synchronization of its radio frames, such as means coupled to a GPS unit for providing a timing signal. According to a preferred embodiment of the invention, each IBH unit includes at least one RF transceiver providing point to point communication, a modem coupled to each transceiver, an antenna array arrangement mounted in the node for providing multiple concurrent transmissions over multiple antennas, one antenna being coupled to each transceiver, and a controller in each node adapted and configured for control and coordination of the transceivers and associated modem. The controller includes means for adaptively allocating up to four MIMO streams to different antennas in the antenna array arrangement and for adaptively allocating modulation, depending on link conditions, and the antennas have beam patterns selected for transmission quality and interference mitigation. Preferably, the unit also includes at least one interference mitigation mechanism implemented by the controller to improve the quality of transmission and minimize interference within the cluster during multiple concurrent transmissions. Operation and implementation of this IBH unit are described in detail in Applicants' co-pending US patent publication no. 2008/0080364, with regard to applicants' Point to Point backhaul method, and US patent publication no. 2008/0049672, cited above, describing applicant's Point to Point backhaul method with interference mitigation, which are entirely incorporated herein by reference. Preferred examples of techniques of backhaul, including MIMO techniques, modulation, antenna configurations, etc. are described in detail in these printed publications.

Figure 2:
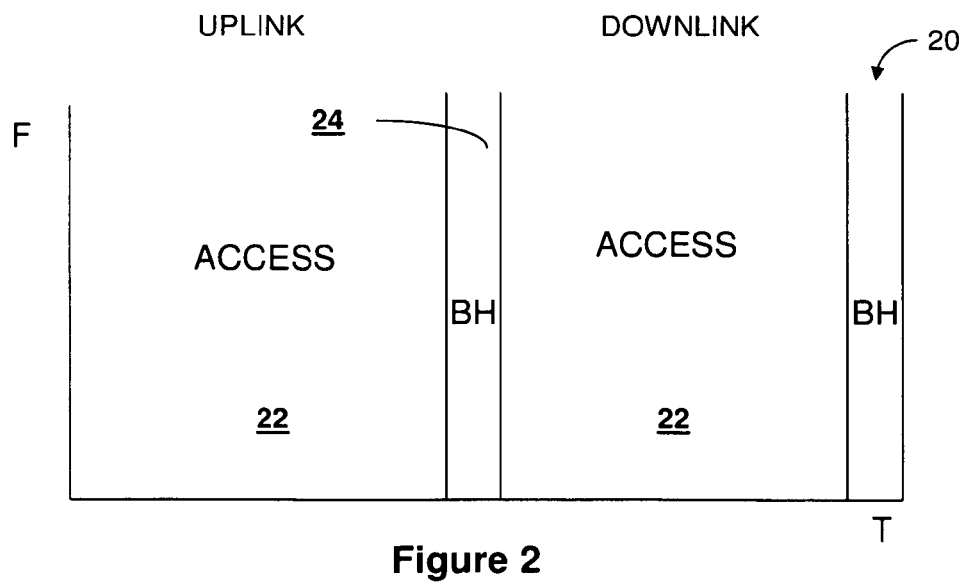
FIG. 2 is a schematic illustration of a communications radio frame, constructed according to one embodiment of the invention.

According to one embodiment of the invention, providing backhaul which is in-band to the base stations, the network works as follows, with further reference to FIG. 1 and with reference to FIG. 2, a schematic illustration of a radio frame 20, showing frequency sub-channels over time of the radio frame, built according to one embodiment of the invention. (In WiMAX®, this radio frame is 5 milliseconds long.) In this embodiment of the invention, the backhaul communication can be transmitted and received on a time or frequency slot that was set aside for measurements, for broadcasting zone or other use, in the access radio frame, which is fully synchronized with the BS node (and configured by the operator). Instead of purely access radio frames, that are used at present for communication between access points (BS 12) and clients (mobile stations 19), for example, each BS 12 is configured to transmit radio frames 20 including an uplink access time slot 22 and a downlink access time slot, and a time slot 24, one during uplink transmission and one during downlink transmission, when the access system stops transmitting. It will be appreciated that this embodiment of the invention is operative in a communications technology that can be gated in time, for example, having a measurement zone, or MBMS (Multimedia Broadcast Multicast Service) in LTE, or any other method of allocating a portion of the time in the RAN, when the MS (mobile stations) are synchronized with the RAN but are not communicating access traffic or any essential information for maintaining the communication with the BS, and which are able to provide total synchronization. During this time slot 24, the IBH unit transmits and/or receives backhaul communications, here on the same frequency channel as the access communications of the base station.

It will be appreciated that time synchronization is provided between all the BS's and the IBH unit's throughout the network, such that each knows precisely when each radio frame begins and, in each one of them, time slot 24 starts and stops at the same time. Time synchronization may be provided, for example, by a BS 12 sending a synchronizing signal (1PPS from a GPS receiver, or a radio frame pulse or in any other reliable synchronization fashion).

The IBH unit 14 will wirelessly distribute over the air the synchronization signal to the remote IBH unit 14' which provides the synchronization signal to the remote BS 12' coupled to it via interface 16'. Thus, the IBH unit 14 provides both data transmission and synchronization signal distribution.

It will further be appreciated that, preferably, the backhaul has very high throughput relative to the access communications, so relatively little time will be taken away from access communication for backhaul. Due to this high capacity, little efficiency is lost. For this purpose, the system of Applicant's patent applications, mentioned above, is particularly useful.

Figure 3:
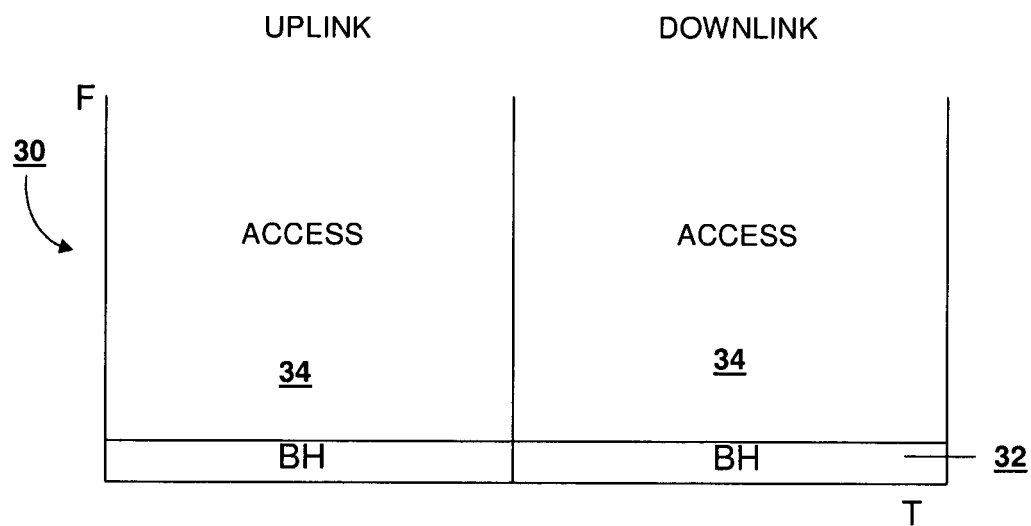
FIG. 3 is a schematic illustration of a communications radio frame, constructed according to another embodiment of the invention.

According to an alternative embodiment of the invention, shown schematically in FIG. 3, when OFDMA (Orthogonal Frequency Division Multiple Access) is utilized for communications, the BS can be configured to provide a frequency slot 32, from the access frequency channel allocated to the BS, in the radio frames 30 where there are no access transmissions, which can be used for backhaul. Thus, the backhaul transmissions can be spread over time rather than over the spectrum, while access transmissions 34 are continuous but over a different frequency channel range in the allocated access frequency channel or channels.

Figure 4:
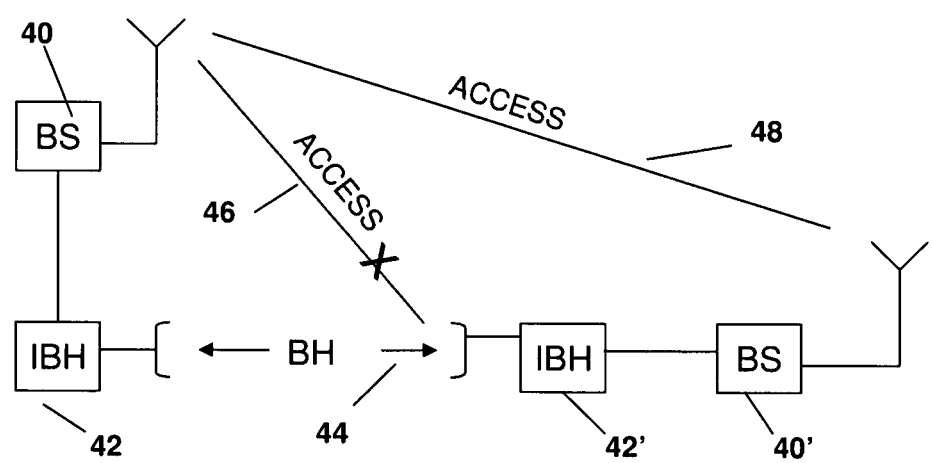
FIG. 4 is a schematic illustration of a radio access network (RAN) constructed and operative in accordance with another embodiment of the invention with interference mitigation.

According to another embodiment of the invention, also providing backhaul in-band in the base station, illustrated schematically in FIG. 4, no separate slot is provided when there is no access transmission. Rather, backhaul is transmitted by IBH unit 42 at the same time that a portion of the access communication is transmitted from BS 40 over the same frequency channel. However, IBH units 42 and 42' utilize interference mitigation techniques (e.g., null steering, and successive interference cancellation algorithms, which are well known in the art), which permit enhancement of the backhaul communication 44 and substantially complete cancellation of the access signals 46 received by IBH unit 42', without disturbing the access communication 48 between the BSs. It will be appreciated that full synchronization between the access transceiver and the backhaul transceiver is also required in this embodiment.

Figure 5:
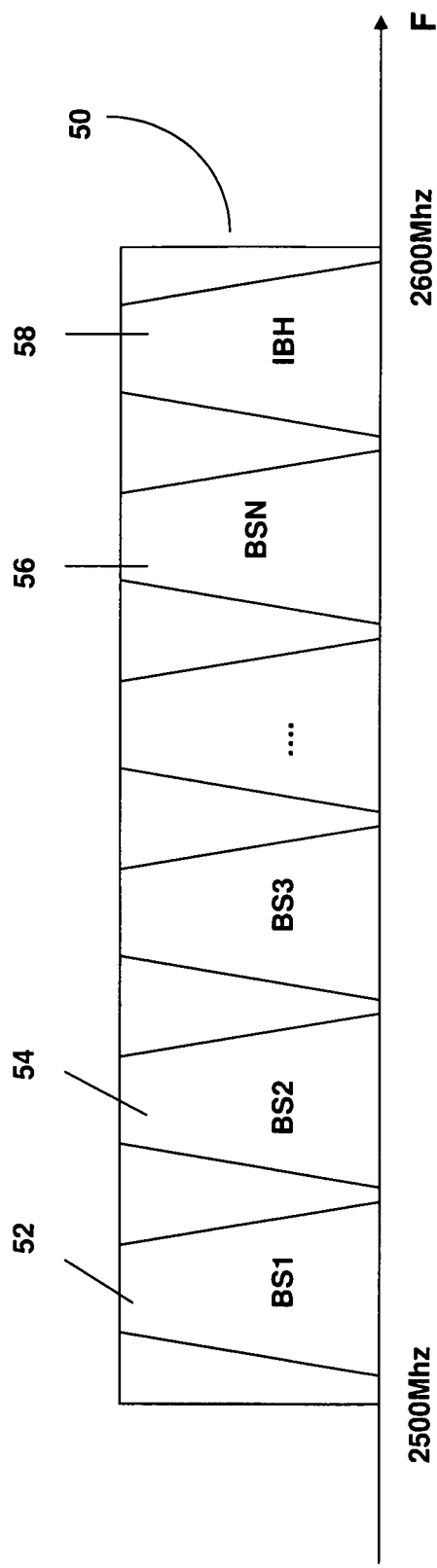
FIG. 5 is a schematic illustration of an access bandwidth allocation.

According to yet another embodiment of the invention, illustrated in FIG. 5, in-band backhaul can be provided by utilizing, for backhaul communications, one or more channels in the overall frequency band 50 allocated for access communication in the RAN 11. In this embodiment, the backhaul between access points (base stations) will be out-of-band relative to each base station but in-band in the overall access frequency band. Thus, one or more frequency channels 52 in the allocated frequency band are allocated to BS1, one or more channels 54 are allocated to BS2, and so on to channels 56 which are allocated to BSN, while a separate channel or channels 58 within the overall access frequency band are allocated to backhaul. Preferably, synchronization in time is provided to improve communication when access and backhaul are transmitted concurrently. The time synchronization techniques between the RAN transceiver and the out-of-band backhaul equipment are similar to those techniques described above for IBH unit synchronization to the RAN BS. This method will ensure that both RAN and BH will transmit and receive at the same time, and it will further reduce the interference between them.

While the present invention has been described with respect to a limited number of embodiments, it will be appreciated that many variations, modifications and other applications of the present invention may be made. It will further be appreciated that the present invention is not limited to what has been described hereinabove merely by way of example. Rather, the invention is limited solely by the claims which follow.

The invention claimed is:

1. A system for providing wireless backhaul in a wireless radio access network having an overall allocated access band for access communication, the system comprising:
   a radio access base station configured for out-of-band backhaul, the radio access base station including an access transceiver configured to transmit and receive access communications between the radio access base station and a mobile station over an allocated frequency channel within the overall allocated access band; and
   a first in-band backhaul unit coupled to the radio access base station, wherein the first in-band backhaul unit is configured to:
      transmit and receive in-band backhaul communications for the radio access base station between the first in-band backhaul unit and a remote second in-band backhaul unit; and
      dynamically coordinate the transmission and reception of the in-band backhaul communications with a transmission and reception of the access communications, wherein the in-band backhaul communications are transmitted or received on a gated slot allocated for measurements or broadcast communications during which there are no cellular access communications, and wherein a radio frame timing is synchronized between the radio access base station and the first in-band backhaul unit.

2. The system according to claim 1, wherein the first in-band backhaul unit includes an in-band backhaul transceiver configured to transmit and receive in the allocated frequency channel.

3. The system according to claim 1, wherein the first in-band backhaul unit includes a transceiver transmitting and receiving in a frequency channel in the overall allocated access band which is not the allocated frequency channel of the radio access base station.

4. The system of claim 2, wherein the first in-band backhaul unit comprises:
   an RF transceiver providing point to point communication;
   a modem coupled to each transceiver;
   an antenna array arrangement providing multiple concurrent transmissions over multiple antennas, one antenna being coupled to each transceiver; and
   a controller configured to control the transceiver and the modem to adaptively allocate up to four MIMO streams to different antennas in the antenna array arrangement and adaptively allocate modulation.

5. The system of claim 2, wherein the first in-band backhaul unit is further configured to:
   synchronize the transmission and reception over the in-band backhaul transceiver with a transmission and reception of a plurality of radio access base stations in the wireless radio access network.

6. The system of claim 2, wherein the first in-band backhaul unit is further configured to:
synchronize transmission and reception over the in-band backhaul transceiver with a transmission and reception of a plurality of in-band backhaul units in the wireless radio access network.

7. The system of claim 1, wherein the first in-band backhaul unit is further configured to:
provide the in-band backhaul communications for the radio access base station over the allocated frequency channel in the allocated access band.

8. The system of claim 7, wherein the first in-band backhaul unit is further configured to:
receive over the allocated frequency channel from the radio access base station.

9. A method for providing wireless backhaul in a wireless radio access network having an overall allocated access band for access communication, the method comprising:
transmitting and receiving, by a first in-band backhaul unit, in-band backhaul communications for a radio access base station between the first in-band backhaul unit and a remote second in-band backhaul unit; and
dynamically coordinating, by the first in-band backhaul unit, the transmission and reception of the in-band backhaul communications at the first in-band backhaul unit with a transmission and reception of access communications between the radio access base station and a mobile station, wherein the in-band backhaul communications are transmitted or received on a gated slot allocated for measurements or broadcast communications during which there are no cellular access communications, and wherein a radio frame timing is synchronized between the radio access base station and the first in-band backhaul unit.

10. The method according to claim 9,
wherein the gated slot comprises a designated slot in each radio communication frame transmitted by an access transceiver of the radio access base station during which there is no cellular access communication; and further comprising:
configuring a backhaul transceiver to communicate in the slot.

11. The method according to claim 9, wherein the gated slot comprises a time slot.

12. The method according to claim 9, wherein the gated slot comprises a frequency slot.

13. The method of claim 9, wherein the in-band backhaul communications are transmitted and received using at least one in-band backhaul transceiver of the first in-band backhaul unit.

14. The method of claim 13, further comprising:
controlling a plurality of transceivers and modems associated with the first in-band backhaul unit to adaptively allocate up to four MIMO streams to different antennas in an antenna array arrangement and adaptively allocate modulation.

15. The method of claim 13, further comprising:
synchronizing the transmission and reception over the in-band backhaul transceiver with a transmission and a reception of a plurality of radio access base stations in the wireless radio access network.

16. The method of claim 13, further comprising:
synchronizing the transmission and reception over the in-band backhaul transceiver with a transmission and a reception of a plurality of in-band backhaul units in the wireless radio access network.

17. The method of claim 9, wherein the first in-band backhaul unit transmits and receives in a frequency channel which is allocated to the radio access base station, wherein the frequency channel comprises an access frequency channel.

18. The method of claim 17, further comprising:
receiving the access frequency channel at the first in-band backhaul unit from the radio access base station.

19. An apparatus for providing wireless backhaul in a wireless radio access network having an overall allocated access band for access communication, the apparatus comprising:
means for transmitting and receiving, by a first in-band backhaul unit, in-band backhaul communications for a radio access base station between the first in-band backhaul unit and a remote second in-band backhaul unit; and
means for dynamically coordinating, by the first in-band backhaul unit, the transmission and reception of the in-band backhaul communications at the first in-band backhaul unit with a transmission and reception of access communications between the radio access base station and a mobile station, wherein the in-band backhaul communications are transmitted or received on a gated slot allocated for measurements or broadcast communications during which there are no cellular access communications, and wherein a radio frame timing is synchronized between the radio access base station and the first in-band backhaul unit.

20. The apparatus according to claim 19,
wherein the gated slot comprises a designated gated slot in each radio communication frame transmitted by an access transceiver of the radio access base station during which there is no cellular access communication; and further comprising:
means for configuring a backhaul transceiver to communicate in the gated slot.

21. The apparatus according to claim 19, wherein the gated slot comprises a time slot.

22. The apparatus according to claim 19, wherein the gated slot comprises a frequency slot.

23. The apparatus of claim 19, further comprising:
means for controlling a plurality of transceivers and modems associated with the first in-band backhaul unit to adaptively allocate up to four MIMO streams to different antennas in an antenna array arrangement and adaptively allocate modulation.

24. The apparatus of claim 19, further comprising:
means for synchronizing the transmission and reception of the in-band backhaul communications with a transmission and a reception of a plurality of radio access base stations in the wireless radio access network.

25. The apparatus of claim 19, further comprising:
means for synchronizing the transmission and reception of the in-band backhaul communications with a transmission and a reception of a plurality of in-band backhaul units in the wireless radio access network.

26. The apparatus of claim 19, wherein the first in-band backhaul unit transmits and receives in a frequency channel which is allocated to the radio access base station, wherein the frequency channel comprises an access frequency channel.

27. The apparatus of claim 26, further comprising:
means for receiving the access frequency channel at the first in-band backhaul unit from the radio access base station.

* * * * *